(12) United States Patent
Fujiwara (10) Patent No.: US 10,604,082 B2
(45) Date of Patent: Mar. 31, 2020

(54) CAMERA UNIT

(71) Applicant: NIFCO INC., Yokosuka-shi, Kanagawa (JP)

(72) Inventor: Kensuke Fujiwara, Yokosuka (JP)

(73) Assignee: NIFCO INC., Yokosuka-Shi (JP)

( * ) Notice: Subject to any disclaimer, the term of this patent is extended or adjusted under 35 U.S.C. 154(b) by 0 days.

(21) Appl. No.: 16/316,277

(22) PCT Filed: Jul. 13, 2017

(86) PCT No.: PCT/JP2017/025493
§ 371 (c)(1),
(2) Date: Jan. 8, 2019

(87) PCT Pub. No.: WO2018/016406
PCT Pub. Date: Jan. 25, 2018

(65) Prior Publication Data
US 2019/0308563 A1    Oct. 10, 2019

(30) Foreign Application Priority Data

Jul. 20, 2016 (JP) ................ 2016-142739

(51) Int. Cl.
*G03B 17/56* (2006.01)
*B60R 11/04* (2006.01)
*B60R 11/00* (2006.01)

(52) U.S. Cl.
CPC ............ *B60R 11/04* (2013.01); *G03B 17/561* (2013.01); *B60R 2011/0026* (2013.01); *B60R 2011/0049* (2013.01)

(58) Field of Classification Search
USPC ...................................................... 396/419
See application file for complete search history.

(56) References Cited

U.S. PATENT DOCUMENTS 8,944,705 B1 * 2/2015 Matori ................ G03B 17/561
                                                        396/419
9,487,156 B2 * 11/2016 Frenzel ................... B60R 11/04
(Continued)

FOREIGN PATENT DOCUMENTS

JP    2015-020695 A    2/2015
JP    2015-193366 A    11/2015
(Continued)

OTHER PUBLICATIONS

PCT/ISA/210, "International Search Report for International Application No. PCT/JP2017/025493," Aug. 29, 2017.
(Continued)

*Primary Examiner* — Clayton E. LaBalle
*Assistant Examiner* — Warren K Fenwick
(74) *Attorney, Agent, or Firm* — Manabu Kanesaka (57) ABSTRACT

A camera unit includes a camera main member; a camera bracket assembled to the camera main member by a first engagement device (for example, a combination between an engagement projection, and an engagement hole or claw); and a fixing bracket assembled to the camera bracket by a second engagement device (a combination between an engagement projection and an engagement hole) so as to mount the camera main member on an attachment object. The first engagement device includes an engagement portion provided in the camera main member, and an engagement piece provided moveably in the camera bracket so as to become engageable with the engagement projection accompanied by a moving displacement. The fixing bracket includes a control portion disposed in a movement space of the engagement piece in a state wherein the camera bracket is assembled by the second engagement device, so that the engagement piece thereof becomes unmovable.

5 Claims, 11 Drawing Sheets

(56) References Cited

U.S. PATENT DOCUMENTS

| | | | |
|---|---|---|---|
| 9,628,680 B2 | 4/2017 | Takeda | |
| 2010/0065707 A1* | 3/2010 | Hansel | B60R 11/04 248/298.1 |
| 2011/0233248 A1* | 9/2011 | Flemming | B60R 11/00 224/482 |
| 2012/0207461 A1* | 8/2012 | Okuda | B60R 11/04 396/419 |
| 2015/0264230 A1* | 9/2015 | Takeda | H04N 5/2252 348/95 |
| 2016/0009230 A1* | 1/2016 | Miyado | B60R 11/04 224/482 |

FOREIGN PATENT DOCUMENTS

| | | |
|---|---|---|
| JP | 2016-016830 A | 2/2016 |
| JP | 2016-203936 A | 12/2016 |

OTHER PUBLICATIONS

Europe Patent Office, "Search Report for European Patent Application No. 17830925.8," Dec. 6, 2019.

\* cited by examiner

CAMERA UNIT

FIELD OF TECHNOLOGY

The present invention relates to a camera unit.

BACKGROUND ART

Figure 11A:
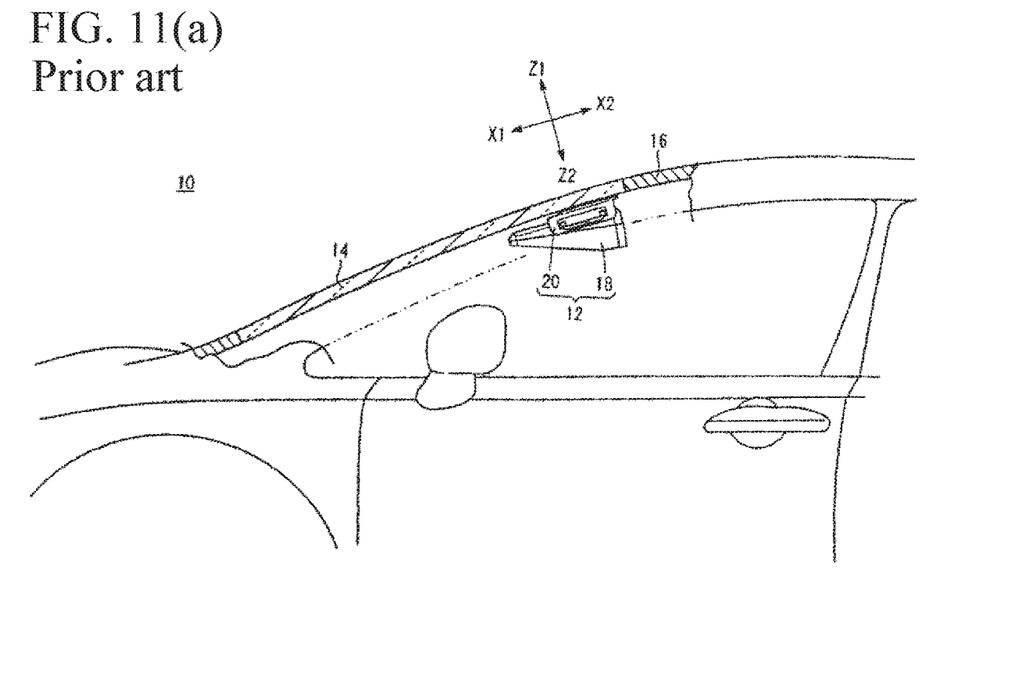
FIGS. 11(a) and 11(b) are a use schematic view and a structural view of essential parts showing a camera unit disclosed in Patent Document 1.
Figure 11B:
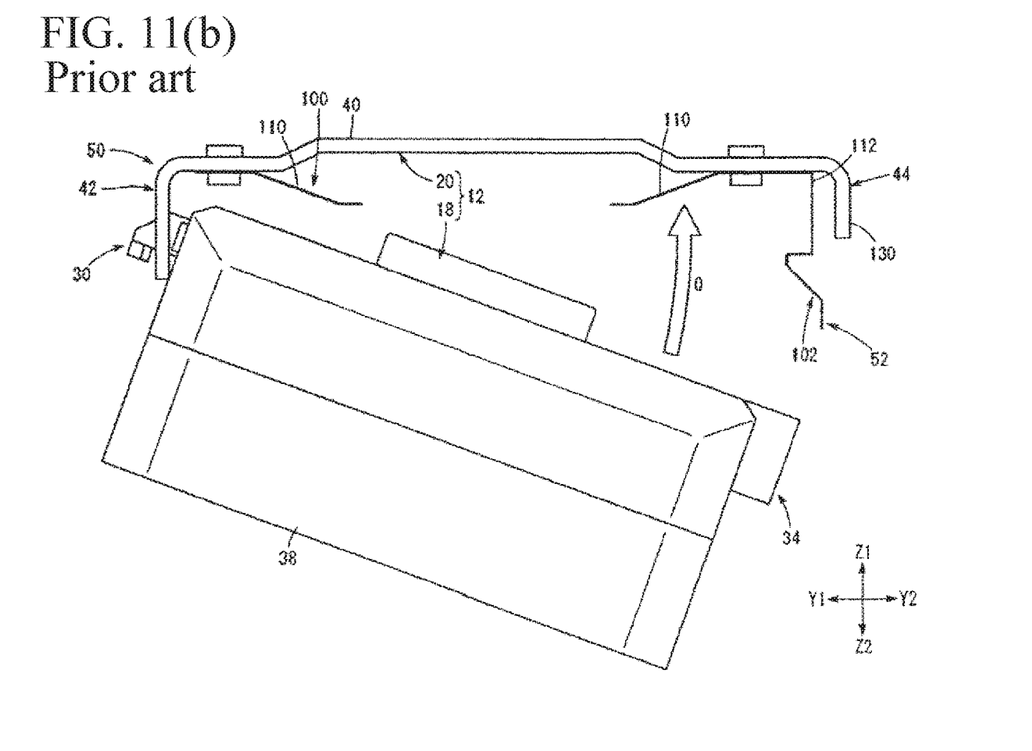

A camera unit of an object is essential for employing a safety system to, for example, avoid a collision by monitoring a vehicle front, or confirming a blind corner of a vehicle back from a driver's seat, and the like. As one example thereof, FIGS. 11(a) and 11(b) show a camera unit disclosed in Patent Document 1. FIG. 11(a) shows a use state wherein a camera unit 12 is attached to a front glass 14 of a vehicle 10; and FIG. 11(b) shows a halfway state of an operation of attaching a camera main member 18 to a bracket 20. The camera unit 12 in FIGS. 11(a) and 11(b) comprises the camera main member 18 and the bracket 20 for attachably and detachably supporting the camera main member 18, and for fixing the camera main member to an attachment object 14.

In that structure, the camera main member 18 includes a hook-shaped portion 30 which is a first attachment portion, and the bracket 20 includes a first support portion 50 turnably supporting the camera main member 18 by hooking the hook-shaped portion 30 of the camera main member, and a second support portion 52 fixing and supporting the camera main member 18. Consequently, in a state wherein the hook-shaped portion 30 of the camera main member is hooked to the first support portion 50, the camera main member is turned so as to be fixed in the bracket 20. Thereby, the camera main member 18 can be fixed without sliding the camera main member 18 to the bracket 20 so as to improve the degree of freedom in design and to achieve space-saving.

Also, in that structure, the second support portion 52 includes a leaf spring 102, and the leaf spring 102 fixes one end thereof to the bracket 20, and the other end thereof can be switched between a press position of pressing the camera main member in a usual state and a separation position of separating from the camera main member. Consequently, after the camera main member is positioned by turning the camera main member in a state wherein the hook-shaped portion 30 of the camera main member is hooked to the first support portion 50 of the bracket, the camera main member 18 can be fixed to the bracket 20 through the leaf spring 102. Moreover, in that structure, in the separation position of the bracket 20, the leaf spring 102 includes a stopper 130 for controlling the leaf spring 102 from further separating from the camera main member 18 so as to prevent a plastic deformation of the leaf spring 102.

PRIOR ART DOCUMENT

Patent Document
Patent Document 1: Japanese Patent Application Publication No. 2015-20695

SUMMARY OF THE INVENTION

Problems to be Solved by the Invention

In the camera unit of the Patent Document 1, in the use state in FIG. 11(a), the camera main member 18 is attachably and detachably held relative to the bracket 20 by a hooking force of the hook-shaped portion 30 which is the first attachment portion to the first support portion 50, and an engagement force between the leaf spring 102 which is the second support portion 52 and an engagement convex portion which is a second attachment portion 34. Consequently, in that structure, for example, when the second attachment portion 34 receives a load in a direction opposite to a direction where the second attachment portion 34 engages the leaf spring 102 by an excessive vibration or collision, there is a possibility of releasing the engagement regardless of the stopper 130. Also, recently, as the camera unit, not just a single-lens camera is used, but also a compound eye camera wherein two or more camera units are mounted is used so as to increase a weight, so that there is also a demand for improving a safety by enhancing an engagement force or a fixing force of the camera main member relative to the bracket to reliably prevent from unexpectedly coming off.

In view of the aforementioned circumstances, an object of the present invention is to provide a camera unit wherein as the engagement force or the fixing force of the camera main member relative to the bracket, even when, for example, the camera main member is heavy, or receives the excessive vibration, an engagement state can be reliably maintained, and a possibility of fall-off from the bracket can be eliminated. Other objects will be clarified in the following explanation.

Means for Solving the Problems

In order to obtain the aforementioned object, the present invention is a camera unit comprising a camera main member; a camera bracket assembled to the camera main member by a first engagement device (for example, an engagement projection and an engagement hole, and/or an engagement projection and a claw); and a fixing bracket assembled to the camera bracket by a second engagement device (for example, an engagement projection and an engagement hole) so as to mount the camera main member on an attachment object. Also, the first engagement device includes an engagement portion provided in the camera main member, and an engagement piece provided moveably in the camera bracket so as to become engageable with the engagement portion accompanied by a moving displacement, and the fixing bracket includes a control portion disposed in a movement space of the engagement piece in a state wherein the camera bracket is assembled by the second engagement device, so that the engagement piece thereof becomes unmovable.

The aforementioned present invention may be embodied as in the following detailed aspects.

(A) The engagement piece has a structure of moving in a width direction of the camera main member. According to the aspect, comparing to a structure of moving in a front-and-back direction of the camera main member, space-saving can be obtained, and a reduction in size can be obtained even slightly.

(B) In the structure, the engagement piece includes a fitting portion relative to the fixing bracket, and the fixing bracket includes a fitted portion which is fitted into the fitting portion. According to the aspect, the engagement piece of the camera bracket includes the fitting portion which fits into the fitted portion of the fixing bracket so as to reinforce an engagement force or a fixing force between the engagement projection and the engagement hole forming the second engagement device. Also, a fitting projection which fits into a recess portion is provided in the corresponding engagement piece so as to reinforce the engagement force or the fixing force by the engagement piece as well, and as a result, coming off unexpectedly or dropping off of the camera main member with the camera bracket relative to the fixing bracket, and the camera main member relative to the camera bracket can be reliably prevented.

(C) In the structure, an assembly direction (for example, an up-and-down direction) of the camera bracket relative to the camera main member, and an assembly direction (for example, a front-and-back direction) of the camera bracket relative to the fixing bracket are different directions, and a fitting direction between the fitting portion and the fitted portion is an approximately same direction as the assembly direction (the front-and-back direction) of the camera bracket relative to the fixing bracket. According to the aspect, in case the assembly direction of the camera bracket relative to the camera main member, and the assembly direction of the camera bracket relative to the fixing bracket are the different directions, the control portion for preventing the engagement piece from moving can be easily added to the fixing bracket as in the case of an embodiment. Also, in case the fitting direction between the fitting portion provided in the engagement piece and the fitted portion of the fixing bracket is approximately the same direction as the assembly direction of the camera bracket relative to the fixing bracket, at the same time of engaging the camera bracket with the fixing bracket, the fitting portion can fit into the fitted portion so as to maintain an excellent workability.

(D) The fitting portion and the fitted portion are formed such that one is the fitting projection, and the other is the recess portion. According to the aspect, the engagement force or the fixing force can be easily reinforced with the space-saving.

(E) In the structure, the second engagement device includes an engagement hole provided in the fixing bracket and passing through in the width direction, and the engagement projection which is provided in the camera bracket and which engages with and disengages from the engagement hole. According to the aspect, the second engagement device can be simplified and easily formed.

(F) In the structure, the camera bracket includes an operation piece portion which can move in the width direction, and the operation piece portion forms the engagement projection and an operation portion for releasing an engagement. According to the aspect, the second engagement device can release the engagement using the operation portion of the operation piece portion so as to easily attach and detach the camera main member to and from the fixing bracket together with the camera bracket during maintenance and the like.

Effect of the Invention

In the present invention, in a structure of attachably and detachably attaching the camera main member relative to the fixing bracket mounted on the attachment object, in place of a leaf spring in the Patent Document 1, the camera bracket for attaching the camera main member to the fixing bracket is used. This camera bracket is assembled to the camera main member by the first engagement device, and is assembled to the fixing bracket by the second engagement device. Also, the first engagement device includes the engagement portion provided in the camera main member, and the engagement piece provided in the camera bracket to be movable for engaging with the engagement portion thereof accompanied by the moving displacement. Simultaneously, the fixing bracket includes the control portion disposed in the movement space of the engagement piece in the state wherein the camera bracket is assembled by the second engagement device, so that the engagement piece thereof becomes unmovable. Thereby, in the present invention, as long as the camera bracket is engaged and fixed in the fixing bracket, the engagement between the camera bracket and the camera main member by the first engagement device is reliably maintained, so that even in a case wherein the camera main member is heavy due to a compound eye camera and the like, or even in a case wherein the camera main member receives an excessive vibration, an impact, or the like, a possibility of coming off or dropping off can be eliminated so as to improve a safety.

BRIEF DESCRIPTION OF THE DRAWINGS

FIGS. 2(a) and 2(b) show the aforementioned camera unit, wherein

FIGS. 8(a) to 8(c) show a relationship between the camera main member and the camera bracket, wherein

FIGS. 9(a) to 9(c) show a relationship between the camera main member with the camera bracket and the fixing bracket, wherein

BEST MODES OF CARRYING OUT THE INVENTION

Hereinafter, one embodiment of the present invention will be explained with reference to accompanying drawings. In the explanation, after a structure of a camera unit shown in FIG. 1 to FIG. 10(b) is clarified, an assembly operation, a relationship with an attachment object, and a relationship with a cover will be described in detail in that order.

Figure 1:
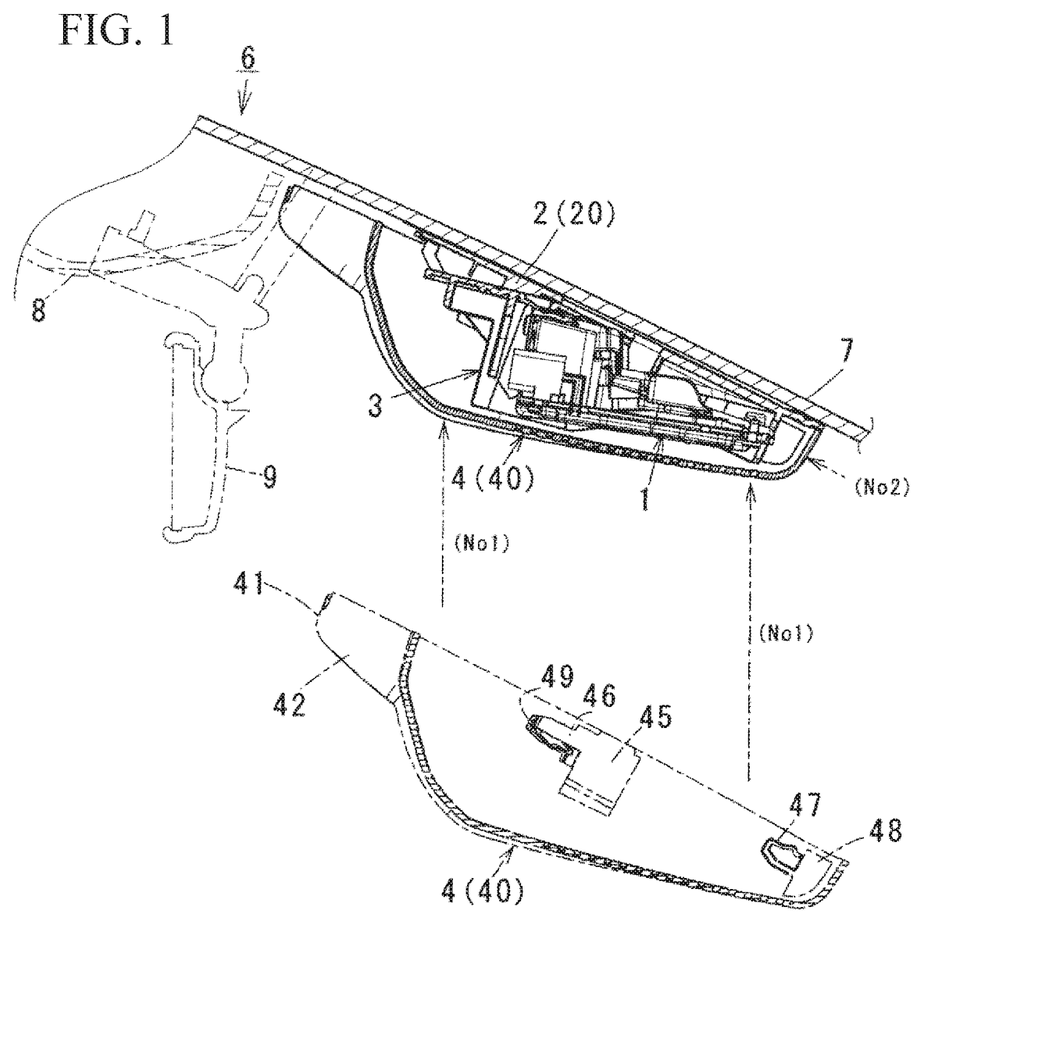
FIG. 1 is a schematic cross-sectional view taken along a line A-A in FIG. 2(a) of a camera unit in a use state according to one embodiment of the present invention.
Figure 2A:
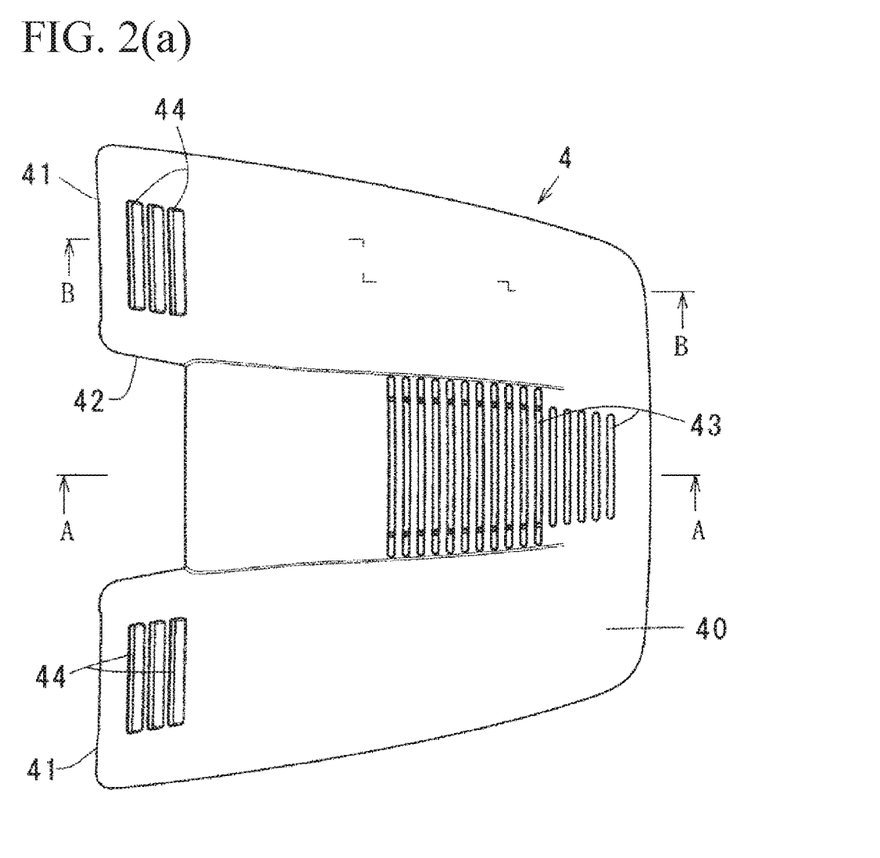
FIG. 2(a) is a bottom view.
Figure 2B:
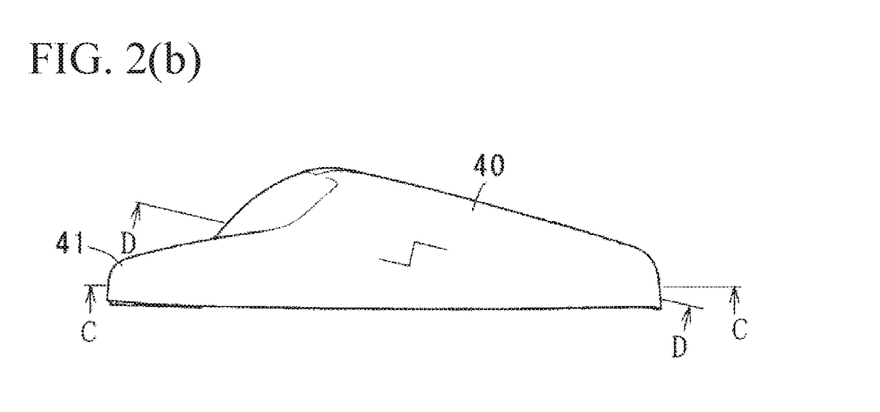
FIG. 2(b) is a schematic side view.

(Structure) As shown in FIG. 1, the camera unit of the embodiment comprises a camera main member 1; a fixing bracket 2 mounted on a front glass 7 which is the attachment object; a camera bracket 3 to be assembled to the camera main member 1 by a first engagement device, and assembled to the fixing bracket 2 by a second engagement device; and a cover 4 to be assembled to the fixing bracket 2 by a third engagement device.

The first engagement device includes engagement projections 16 and 17 provided in the camera main member 1, and engagement pieces 35 and 37 provided to be moveable in the camera bracket 3. The second engagement device includes engagement projections 33a provided in the camera bracket 3 and engagement holes 23 provided in the fixing bracket 2. The third engagement device includes engagement holes 27 and 28 provided in the fixing bracket 2, and clip portions 46 and 49 provided in the cover 4. Also, the fixing bracket 2 includes control portions 26 disposed in movement spaces of the engagement pieces 35 and 37 in a state wherein the camera bracket 3 is assembled by the second engagement device so that the engagement pieces thereof become unmovable; and standing walls 22 (in particular, corresponding portions of the standing walls) corresponding to the control portions. Furthermore, each engagement piece 35 includes a fitting projection 36 which is a fitting portion relative to the fixing bracket 2, and the fixing bracket 2 includes recess portions 25 which are a fitted portion to be fitted in the fitting projection 36. Hereinafter, details thereof will be clarified.

As shown in FIG. 6, FIG. 7, and FIGS. 10(a) and 10(b), the camera main member 1 includes a base 10 having an approximately rectangular shape, and a holding member 12 to be mounted on the base 10. The base 10 may be made of aluminum sheet metal, and the holding member 12 may be made of die-cast aluminum. The holding member 12 includes a connector 11 for connecting to an external device and the like provided on a back face side; a pair of hole portions 15 provided on the right and left on a back side 14 which is made one step higher than a front side 13; and the engagement projections 16 on the front side and the engagement projections 17 on the back side, provided to project on both side faces; and the like. Lenses 18 are mounted on the respective hole portions 15. The engagement projections 16 and the engagement projections 17 are engagement portions forming the first engagement device, and are provided to face each other respectively on both sides of the holding member 12. An FPGA (field-programmable gate array), a CPU, a memory, and the like (not shown in the drawings) are built in between the base 10 and the holding member 12. The reference symbol 13a represents a convex portion provided in a middle on the front side of the holding member 12. The reference symbol 19 represents stoppers for fixing the holding member 12 to the base 10.

The fixing bracket 2 may be a resin molded member having an approximately rectangular plate shape which is one size larger than the camera bracket 3; a center portion has an opening 21 in a rectangular shape; an upper face 20 is a holding face for attaching the camera bracket 3; and a lower face on an opposite side becomes an attachment face relative to the front glass 7 which is the attachment object. Also, the fixing bracket 2 includes the standing walls 22 and 22 located on the upper face 20 and provided to face each other on both sides sandwiching the opening 21; the engagement holes 23 provided on a back side of the respective standing walls 22; guide projections 24 provided at an approximately middle on the front and back of an inner face of the respective standing walls 22; the recess portions 25 provided on a front side of the respective standing walls 22; the control portions 26 provided just in front of the respective recess portions 25; the engagement holes 27 provided on an outer back side of the respective standing walls 22; and the engagement holes 28 provided on the front side of the respective standing walls 22.

Both the standing walls 22 are provided in parallel by maintaining an interval wherein the camera bracket 2 can be housed. Each engagement hole 23 forms the aforementioned second engagement device, and is provided in an extension wall connected to each standing wall 22 to pass through in a width direction. Each guide projection 24 is provided in a height maintaining a predetermined gap with the upper face 20, and guides a front and back movement of the camera bracket 2 when the camera bracket 2 is assembled to the fixing bracket 2.

Figure 6:
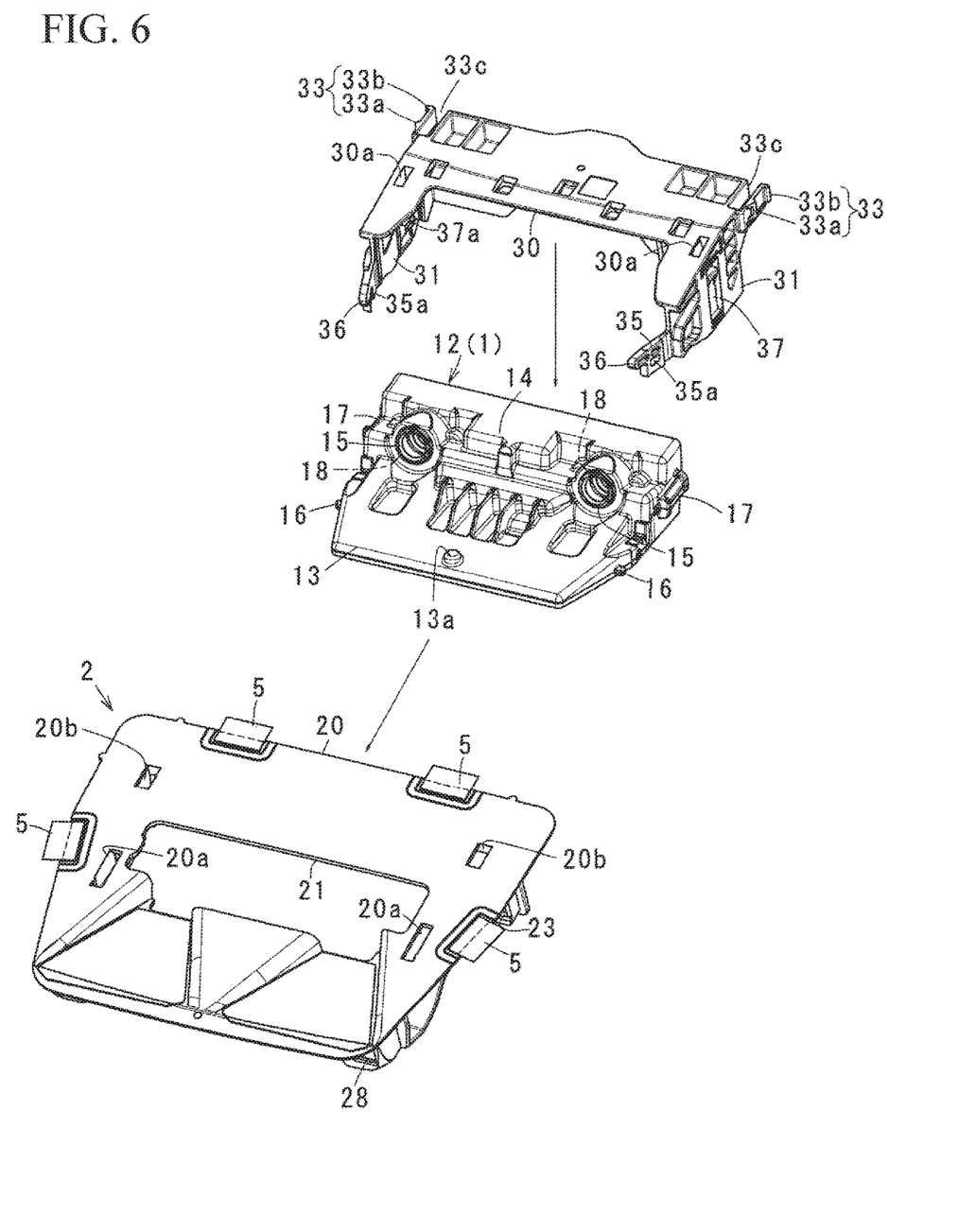
FIG. 6 is a schematic external view showing a relationship between a camera main member, a fixing bracket, and a camera bracket forming the camera unit.
Figure 7:
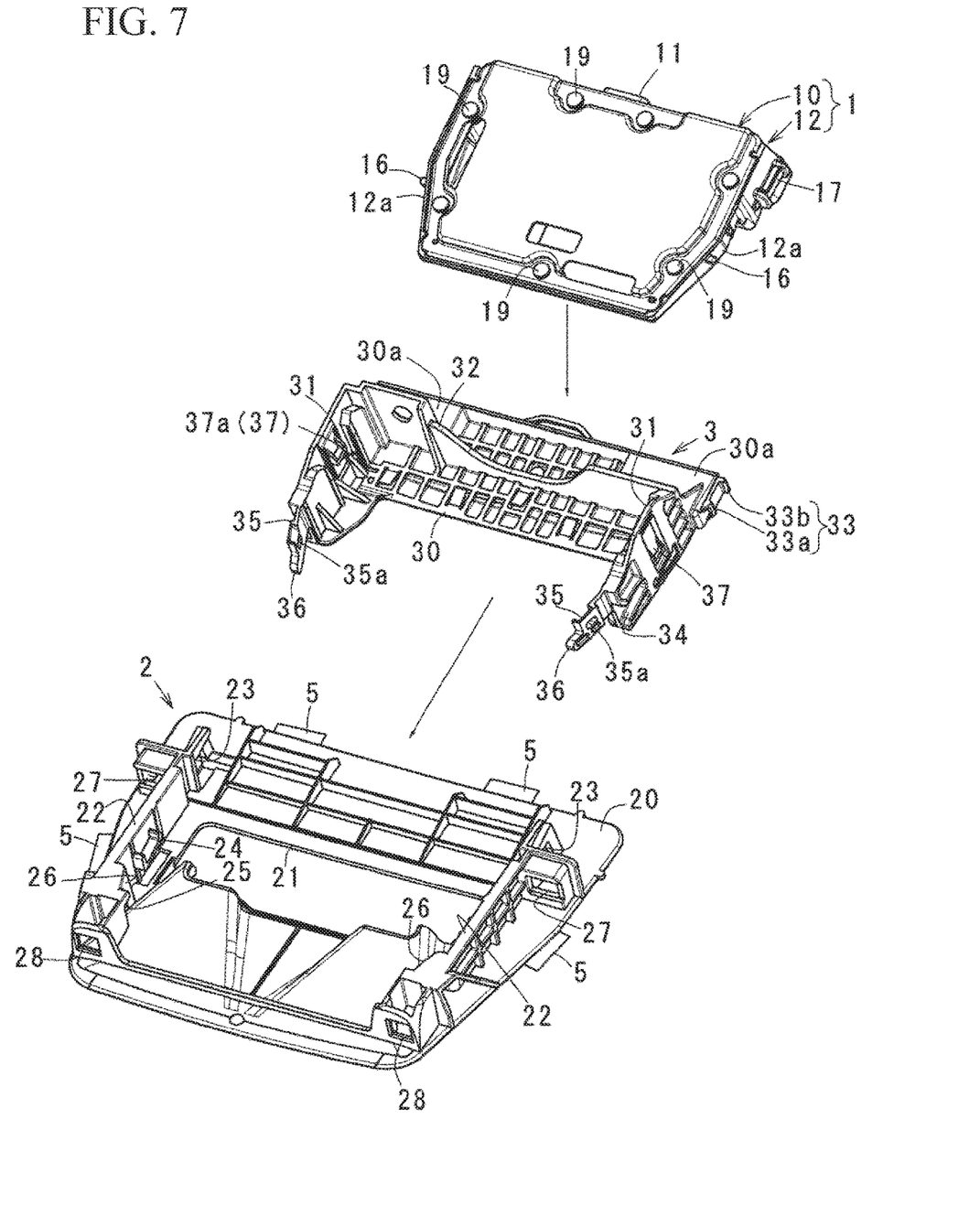
FIG. 7 is a schematic external view showing a state wherein the camera main member, the fixing bracket, and the camera bracket in FIG. 6 are upside down.
Figure 8A:
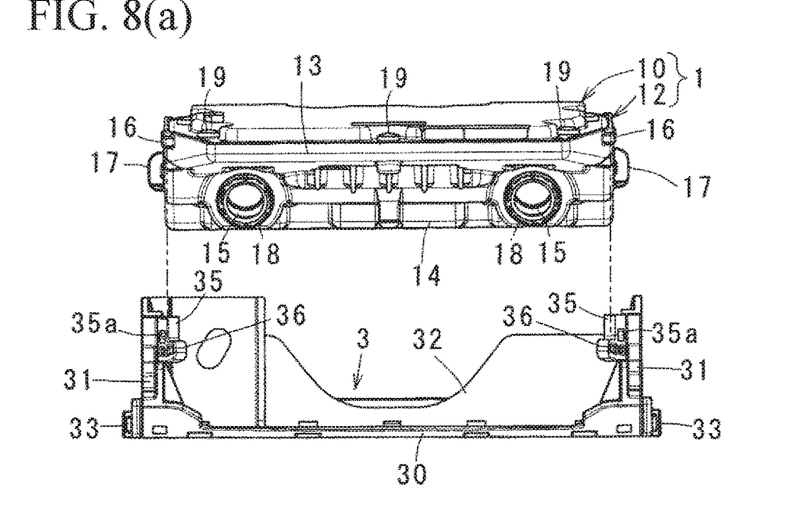
FIGS. 8(a) and 8(b) are a front view and a side view showing both members in a state before an assembly.
Figure 8B:
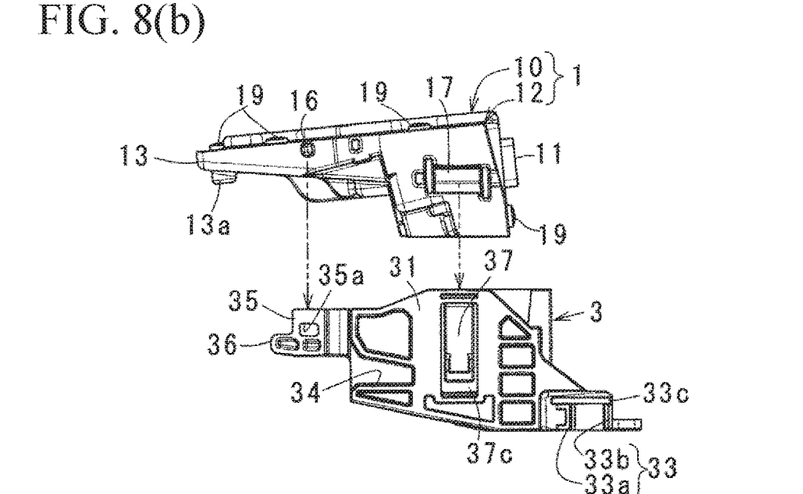
Figure 8C:
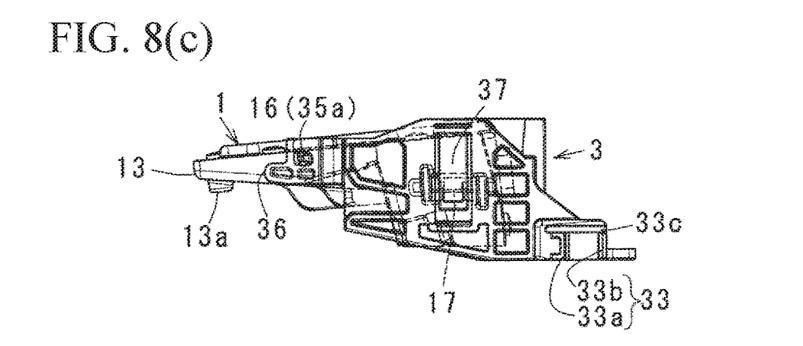
FIG. 8(c) is a side view showing the both members in a state after the assembly (the camera main member with the camera bracket).

Each recess portion 25 is a die-cutting hole provided adjacent to the control portion 26, i.e. having a shape wherein a lower side of an upper wall portion becomes a fitting space. Both the control portions 26 are formed as a slope face wherein a distance or an interval therebetween becomes smaller gradually as going from a back side to a front side. The engagement holes 27 and the engagement holes 28 are the holes opening in a front-and-back direction, and are portions for allowing the cover 4 to be attached and detached by engaging with and disengaging from corresponding portions of the cover 4. Each engagement hole 27 is open on a side wall connected to a backward side face of the standing wall 22. Each engagement hole 28 is open on a side wall forming an approximately rectangular wall portion connected to a front of the standing wall 22. In FIG. 6, the reference symbols 20a and 20b represent die-cutting holes.

In contrast, the camera bracket 3 is an approximately U-shaped resin molded member having a size which can be housed between the standing walls 22 of the fixing bracket 2, and comprises a placement plate 30; side walls 31 rising on both sides of the placement plate 30; and a lateral wall 32 located at an approximately middle on the front and back of the placement plate 30, and rising between the two side walls 31. On backward both sides of the placement plate 30, there are provided operation piece portions 33 along side faces by maintaining gaps 33c between the operation piece portions 33 and corner portions 30a (see FIG. 7). Each operation piece portion 33 can move in a plate width direction in a state wherein a front side is connected to the side face of the placement plate 30, and includes an engagement projection 33a provided on the side face on a connection portion side, and an operation portion 33b provided on the side face on a free end side. Also, on outer faces of the two side walls 31, there are provided guide grooves 34 into which the guide projections 24 of the fixing bracket 2 slidingly fit. Each guide groove 34 extends approximately horizontally in a state wherein a tip side thereof is open.

Both the side walls 31 include the engagement pieces 37 provided at an approximately middle position on the front and back; engagement pieces 35 provided to project forward; and fitting projections 36 located at tips of the respective engagement pieces 35, and provided to project forward. Each engagement piece 37 is divided by a U-shaped slit, and can move sideways at a supporting point on an upper side, or in the plate width direction of the placement plate. On inner faces of the respective engagement pieces 37, there are provided claws 37a facing each other and engageable with the corresponding engagement projections 17 of the camera main member 1.

On the other hand, both the engagement pieces 35 become thinner and more slender than the side walls 31, and are provided in an approximately inverted V shape which has an interval narrowing each other toward a tip side thereof. Also, each engagement piece 35 can move sideways at a supporting point on a portion connected to a front end face of the side wall 31, or in the plate width direction of the placement plate. In the respective engagement pieces 35, there are provided engagement holes 35a engageable with the corresponding engagement projections 16 of the camera main member 1. Both the fitting projections 36 are formed thinner than the engagement pieces 35, and extend in front of each engagement piece 35.

(Assembly operation) Next, an assembly procedure of the aforementioned camera main member 1, the camera bracket 3, and the fixing bracket 2 will be described. First, the camera main member 1 is attachably and detachably engaged with the camera bracket 3 by the first engagement device so as to be assembled. In the operation procedure, as shown in FIG. 7 and FIGS. 8(a) to 8(c) as an example, in a state wherein a base 10 side faces upward, the camera main member 1 moves downward in such a way so as to be housed between the two side walls 31 of the camera bracket 3, or the camera main member 1 and the camera bracket 3 move to come close to each other. At that time, the engagement projections 16 and 17 on both sides of the camera main member are attempted to fit into the corresponding engagement holes 35a and claws 37a of the camera bracket. Then, after the engagement projection 16 abuts against the corresponding engagement piece 35, the engagement projection 16 engages the engagement hole 35a accompanied by a moving displacement of the engagement piece 35. After the engagement projection 17 abuts against the corresponding claw 37a, the engagement projection 17 climbs over the claw 37a accompanied by a moving displacement of the engagement piece 37 so as to engage the claw 37a. In this way, the camera main member 1 is held relative to the camera bracket 3 by respective engagements between the engagement projection 16 and the engagement hole 35a, and between the engagement projection 17 and the claw 37a, which form the first engagement device.

Figure 9A:
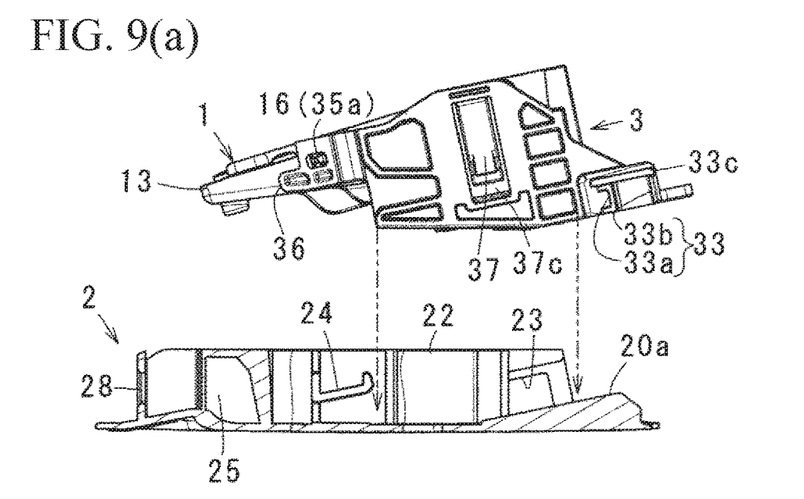
FIG. 9(a) is a partially cross-sectional side view showing both members in a separation state.
Figure 9B:
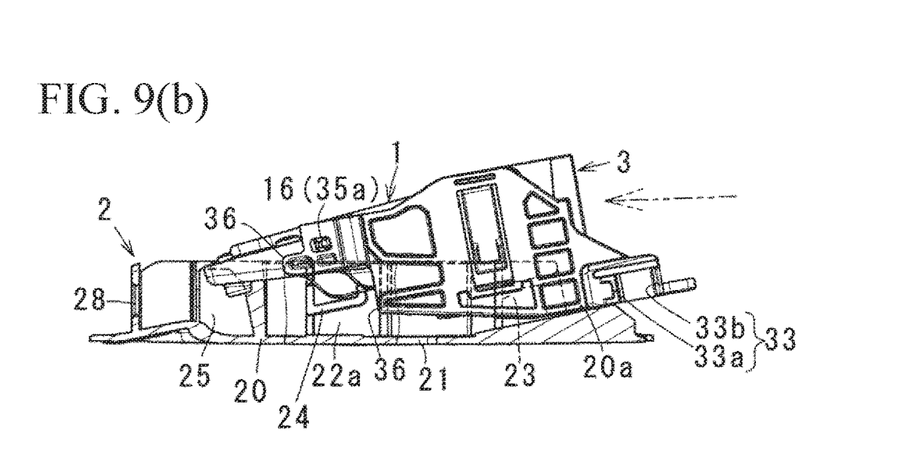
FIG. 9(b) is a partially cross-sectional side view showing a state wherein one of the both members is positioned in the other of the both members.
Figure 9C:
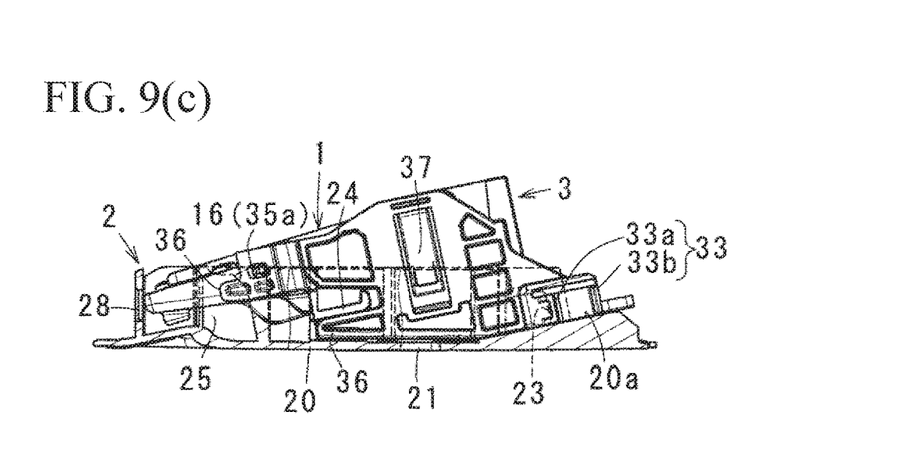
FIG. 9(c) is a partially cross-sectional side view showing a state wherein one of the both members is assembled to the other of the both members.

Next, the aforementioned camera main member 1 with the camera bracket attachably and detachably engages relative to the fixing bracket 2 by the second engagement device to be assembled. In the operation procedure, as shown in FIGS. 9(a) to 9(c) as an example, after the camera main member 1 with the camera bracket is disposed between the standing wall 22 and the standing wall 22 of the fixing bracket as shown in FIG. 9(a), the camera main member 1 with the camera bracket slides in an arrow direction in FIG. 9(b), i.e. in a front direction of the fixing bracket 2. At that time, the guide projection 24 enters into the guide groove 34, and the camera main member 1 with the camera bracket smoothly moves forward accompanied by a guide operation of the guide projection 24. Finally, each engagement projection 33a of the operation piece portion 33 on both sides, forming the second engagement device, engages the corresponding engagement hole 23 accompanied by an elastic displacement, and simultaneously, the fitting projection 36 on both sides respectively fits into the corresponding recess portion 25. In other words, in the camera main member 1 with the camera bracket, both front sides are assembled by the fitting of the fitting projection 36 relative to the recess portion 25, and both back sides are assembled by an engagement of the engagement projection 33a relative to the engagement hole 23.

Figure 4:
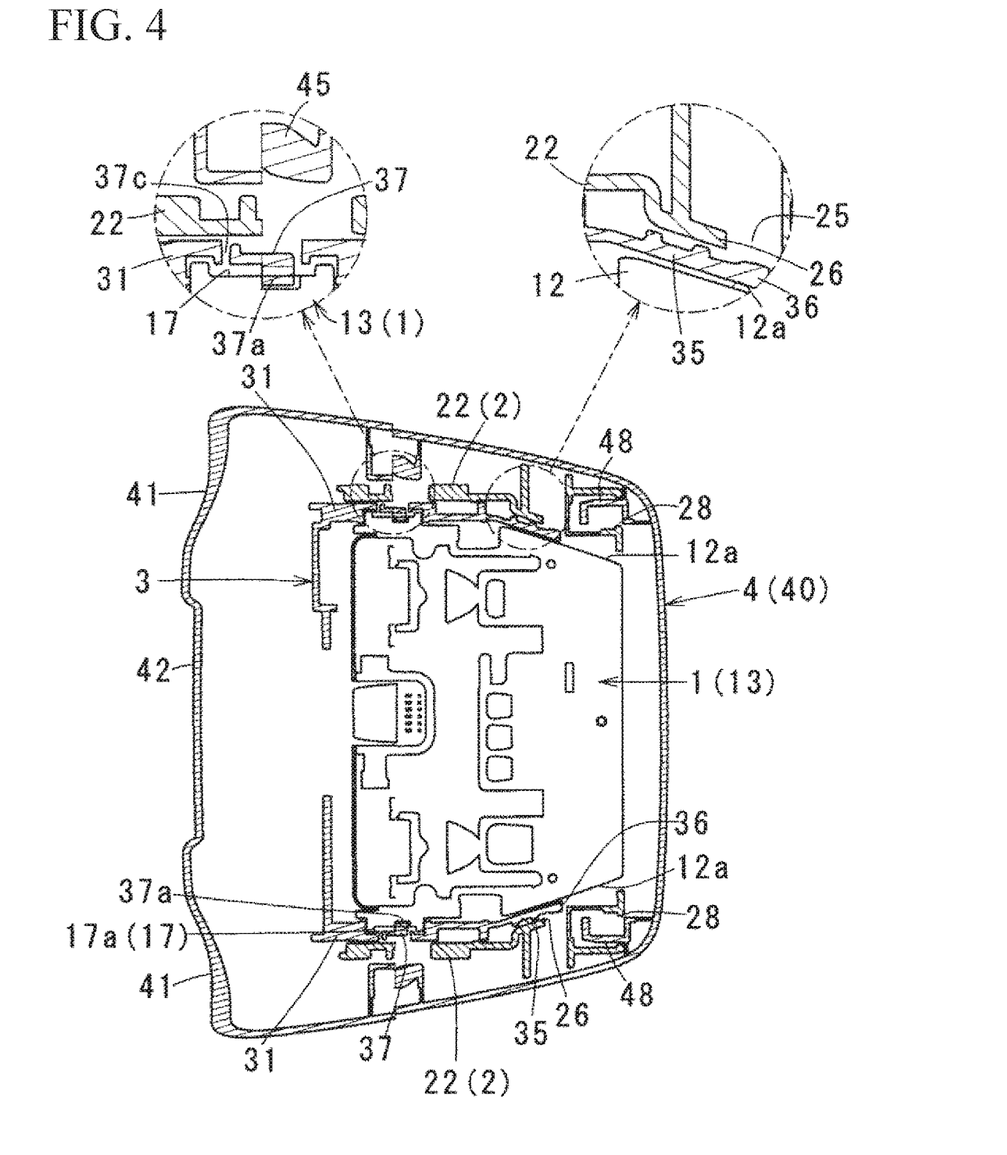
FIG. 4 is a cross-sectional view taken along a line D-D in FIG. 2(b).
Figure 5:
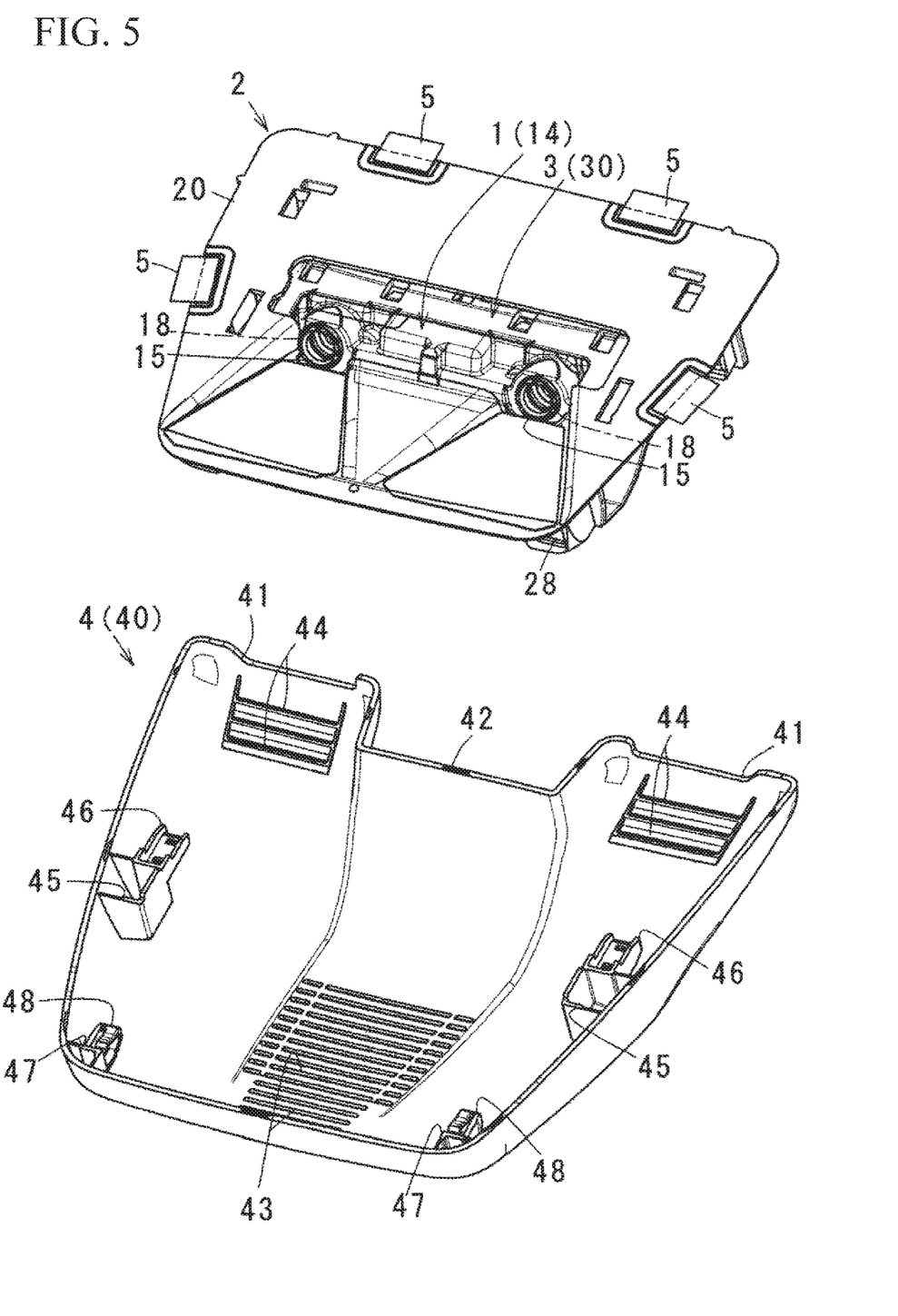
FIG. 5 is a schematic external view showing a state wherein a cover is removed from the camera unit.

Also, in that structure, in a state of the camera unit wherein the camera main member 1 with the camera bracket is assembled to the fixing bracket 2, as shown in an enlarged view on a right side in FIG. 4, the control portion 26 located just in front of the recess portion 25 is disposed in the movement space of the engagement piece 35 to control the engagement piece 35 thereof to be unmovable. Simultaneously, as shown in an enlarged view on a left side in FIG. 4, the corresponding portion of the standing wall 22 is disposed in the movement space of the engagement piece 37 forming the claw 37a to control the engagement piece 37 thereof to be unmovable. As a result, in that structure, as long as the camera bracket 3 is engaged to be fixed in the fixing bracket 2, the engagement between the camera bracket 3 and the camera main member 1 by the first engagement device, i.e. the respective engagements between the engagement projection 16 and the engagement hole 35a, and between the engagement projection 17 and the claw 37a are reliably maintained. Thereby, for example, in a case wherein the camera main member 1 is heavy due to a compound eye camera and the like, or even in a case wherein the camera main member 1 receives an excessive vibration, an impact, or the like, a possibility of coming off unexpectedly or dropping off can be eliminated so as to improve a safety.

(Relationship with the attachment object) As shown in FIG. 6, in the aforementioned fixing bracket 2, double-coated adhesive tapes 5 are attached at a plurality of portions (in this example, 4 to 5 portions) on a lower face, and for example, the fixing bracket 2 is mounted at a predetermined position of the front glass 7 in FIG. 1. Namely, in FIG. 1, the reference numeral 6 represents a vehicle such as an automobile and the like, and the reference numeral 8 schematically represents a ceiling material inside a vehicle interior. On a front side of the ceiling material 8, a rearview mirror 9 is held through a support portion fixed on a side of the ceiling material 8. The aforementioned camera unit is mounted relative to the front glass 7 so as not to buffer with the support portion of the rearview mirror 9. In that mounting procedure, either of the following methods may be appropriate, a method wherein after only the fixing bracket 2 is mounted on the front glass 7, the camera main member 1 with the camera bracket is assembled relative to the fixing bracket 2 thereof by the aforementioned procedure; or a method wherein the fixing bracket 2 is mounted on the front glass 7 in a state wherein the camera main member 1 with the camera bracket is assembled to the fixing bracket 2. Incidentally, as the attachment object, there is also a case other than the front glass, in such a case, the fixing bracket 2 is mounted by welding or other stoppers.

(Relationship with the cover) In the aforementioned camera unit, the cover 4 is attachably and detachably assembled relative to the fixing bracket 2 as necessary in order to maintain a satisfactory appearance in a use state. As shown in FIG. 1, FIGS. 2(a) and 2(b), and FIG. 5, in the cover 4, a main member portion 40 has a size which covers a whole camera unit, and is formed such that an upper side has a concave portion 42 wherein a middle portion on the right and left is notched relative to both side portions 41 and 41. The concave portion 42 has a shape for escaping from the support portion of the aforementioned rearview mirror 9. Inside the main member portion 40, there are included a plurality of slits 43 located at a middle on the right and left, and provided on a lower side; a plurality of slits 44 provided on the right and left on the upper side; support portions 45 located on both sides and provided to project at an approximately middle on the top and bottom; clip support portions 46 located on a projection side of the support portions 45, and provided to project in an upper-side horizontal direction; support portions 47 provided to project at lower-side corner portions; and clip portions 48 located on a projection side of the support portions 47, and provided to project in the upper-side horizontal direction.

Figure 3A:
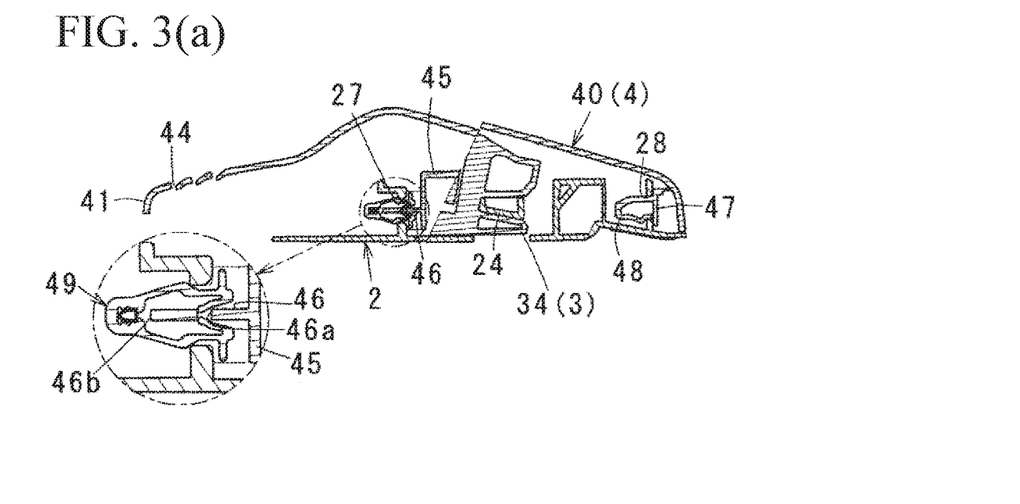
FIG. 3(a) is a cross-sectional view taken along a line B-B in FIG. 2(a)
Figure 3B:
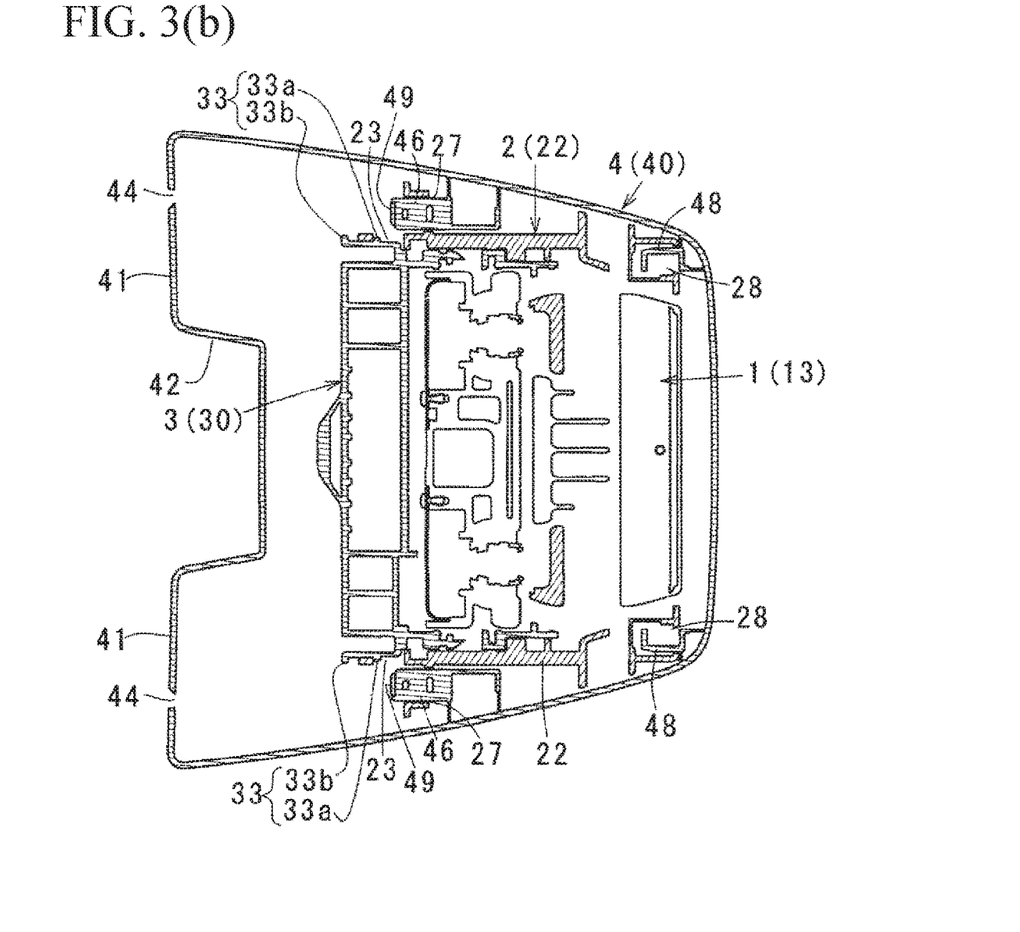
FIG. 3(b) is a cross-sectional view taken along a line C-C in FIG. 2(b).

The respective slits 43 and 44 are provided for improving a design property and obtaining a heat dissipation function. The support portion 46 holds the clip portion 49 which may be made of specialized resin shown in an enlarged view in FIG. 3(*a*). Then, in the aforementioned cover 4, the clip portion 48 engages the aforementioned engagement hole 27, and the clip portion 49 engages the aforementioned engagement hole 47, i.e. the cover 4 is attachably and detachably assembled relative to the fixing bracket 2 by the third engagement device. In that assembly operation procedure, for example, as shown by a dashed-dotted line in FIG. 1, after the cover 4 moves upwardly (No1) toward the camera unit in the same drawing, the cover 4 moves obliquely upwardly (No2). On the contrary, as a separation operation procedure, after the cover 4 moves obliquely downwardly, the cover 4 moves downwardly to be removed.

(Operation) The aforementioned camera unit has the following excellent advantages.

(A) The camera bracket 3 is assembled to the camera main member 1 by the first engagement device (the engagement projection 16 and the engagement hole 35*a*, and the engagement projection 17 and the claw 37*a*), and is assembled to the fixing bracket 2 by the second engagement device (the engagement projection 33*a* and the engagement hole 23). Also, the first engagement device includes the engagement projections 16 and 17 provided in the camera main member 1, and the engagement pieces 35 and 37 moveably provided in the camera bracket 3 so as to engage the engagement projections thereof accompanied by the moving displacement. Simultaneously, the fixing bracket 2 includes the control portion 26 disposed in the movement space of the engagement piece 35 or 37 in the state wherein the camera bracket 3 is assembled by the second engagement device so that the engagement piece thereof becomes unmovable; and the standing wall 22 corresponding to the control portion. Consequently, in that structure, as long as the camera bracket 3 is engaged to be fixed in the fixing bracket 2, the engagement between the camera bracket 3 and the camera main member 1 by the first engagement device, i.e. the respective engagements between the engagement projection 16 and the engagement hole 35*a*, and between the engagement projection 17 and the claw 37*a* are reliably maintained. As a result, in that structure, for example, in the case wherein the camera main member 1 is heavy due to the compound eye camera and the like, even in the case wherein the camera unit receives the excessive vibration, the impact, or the like, the possibility of coming off unexpectedly or dropping off can be eliminated so as to improve the safety and reliability.

(B) In that structure, the engagement piece 35 or 37 of the camera bracket 3 moves in a width direction of the camera main member 1, so that comparing with a structure of moving in a front-and-back direction of the camera main member 1, space-saving can be easily obtained, and a reduction in size can be obtained even slightly. Also, the engagement piece 35 includes the fitting projection 36 which is the fitting portion for fitting into the recess portion 25 which is the fitted portion of the fixing bracket 2 so as to reinforce an engagement force or a fixing force of the engagement pieces 35 and 37 forming the first engagement device and to reliably prevent the camera main member 1 from unexpectedly falling off.

(C) In that structure, an assembly direction of the camera bracket 3 relative to the camera main member 1 and an assembly direction of the camera bracket 3 relative to the fixing bracket 2 are different directions, so that as in the case of the embodiment, the control portion 26 for preventing the engagement pieces 35 and 37 from moving, or the standing wall 22 corresponding to the control portion can be easily added to the fixing bracket 2. Also, a fitting direction between the fitting projection 36 provided in the engagement pieces 35 and 37 and the recess portion 25 of the fixing bracket 2 is an approximately same direction as the assembly direction of the camera bracket 3 relative to the fixing bracket 2, so that at the same time of engaging the camera bracket 3 with the fixing bracket 2, the fitting projection 36 can fit into the recess portion 25, and an excellent workability can be maintained. Moreover, when a structure of fitting the fitting projection 36 to the recess portion 25 is added as in the case of the embodiment, as the second engagement device, a high engagement force or fixing force can be easily maintained with the space-saving.

Figure 10A:
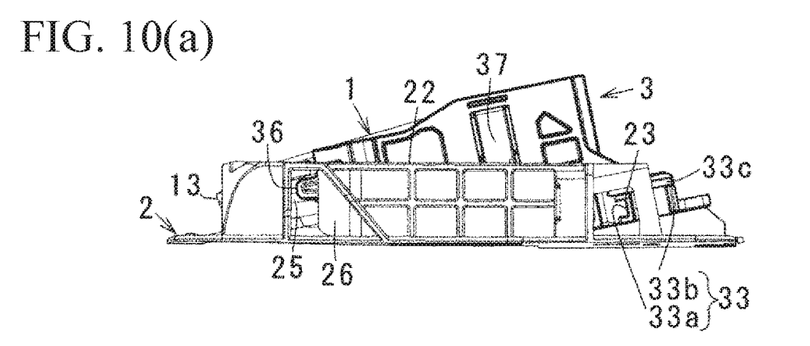
FIGS. 10(a) and 10(b) are a side view and a rear view in a state without cross section in FIG. 9(c).
Figure 10B:
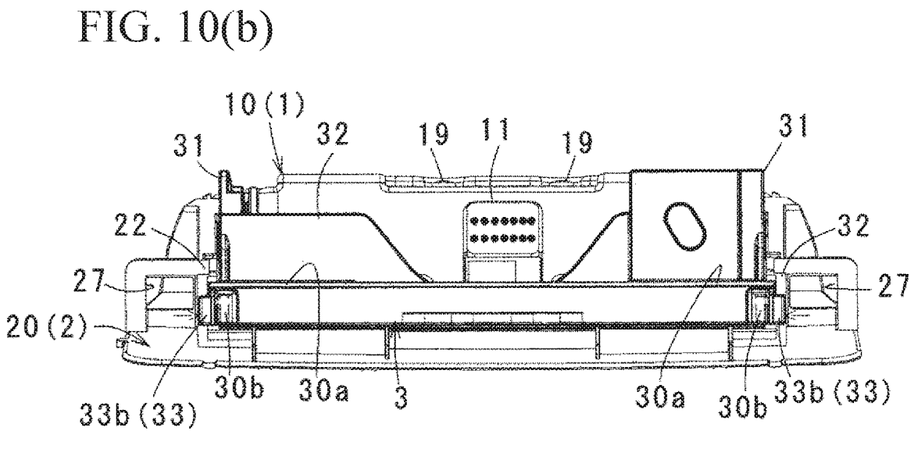

(D) In that structure, the second engagement device is formed by the engagement hole 23 provided in the fixing bracket 2, and passing through in the width direction, and the engagement projection 33*a* of the camera bracket so as to be simplified and easily formed. Also, the second engagement device can release the engagement using the operation portion 33*b* of the operation piece portion 33 so as to excel in easy attachment and detachment of the camera main member 1 together with the camera bracket 3 from the fixing bracket 2 during maintenance and the like. In FIG. 10(*b*), in a case wherein the camera main member 1 is removed together with the camera bracket 3 relative to the fixing bracket 2, when the operation portions 33*b* of the operation piece portions 33 disposed on both sides are operated to be pressed in an arrow direction in the same drawing, i.e., in a direction wherein the operation portions 33*b* on both sides come close, each engagement projection 33*a* is disengaged from the corresponding engagement hole 23. There, in that state, the camera main member 1 is operated to move backward wherein the camera main member 1 separates from the fixing bracket 2 together with the camera bracket 3.

Incidentally, the present invention can be appropriately changed except for requirements specified in the invention. Also, the attachment object is not limited to the front glass 7, and other members such as an automotive body panel and the like, or various devices may be used as the attachment object. Although the fixing bracket 2 is fixed into the attachment object by the double-coated adhesive tapes 5, as a fixing method, other locking tools such as an adhesive agent, the welding, a bolt, and the like may be used.

EXPLANATION OF SYMBOLS

1 . . . a camera main member (10 is a base, and 12 is a holding member.)
2 . . . a fixing bracket (20 is an attachment plate portion, and 21 is an opening.)
3 . . . a camera bracket (30 is a placement plate, and 31 is side walls.)
4 . . . a cover (40 is a main member portion, and 41 is back both sides.)
5 . . . double-coated adhesive tapes
6 . . . a vehicle
7 . . . a front glass (an attachment object)
8 . . . a ceiling material
9 . . . a rearview mirror
15 . . . mounting holes
16 . . . engagement projections (a first engagement device)
17 . . . engagement projections (the first engagement device)
18 . . . cameras
22 . . . standing walls (one portion is control portions.)

23 ... engagement holes (a second engagement device)
25 ... recess portions (fitted portions)
26 ... control portions
27 ... engagement holes (a third engagement device)
28 ... engagement holes (the third engagement device)
30 ... a flat plate portion
33 ... operation piece portions (33b is operation portions.)
33a ... engagement projections (the second engagement device)
35 ... engagement pieces (35a is engagement holes)
35a ... engagement holes (the first engagement device)
36 ... fitting projections (fitting portions)
37 ... engagement pieces (37a is claws.)
37a ... claws (the first engagement device)
46 ... clip support portions
48 ... clip portions (the third engagement device)
49 ... clip portions (the third engagement device)

Incidentally, all contents of the specification, claims, drawings, and abstract of Japanese Patent Application No. 2016-142739 filed on Jul. 20, 2016 are cited in their entireties herein and are incorporated as a disclosure of the specification of the present invention.

What is claimed is:

1. A camera unit, comprising:
a camera main member;
a camera bracket assembled to the camera main member by a first engagement device; and
a fixing bracket assembled to the camera bracket by a second engagement device so as to mount the camera main member on an attachment object,
wherein the first engagement device includes an engagement projection provided in the camera main member, and an engagement piece provided movably in the camera bracket so as to become engageable with the engagement projection accompanied by a moving displacement,
the fixing bracket includes a control portion disposed in a movement space of the engagement piece in a state wherein the camera bracket is assembled by the second engagement device, so that the engagement piece thereof becomes unmovable,
the engagement piece forms a fitting portion relative to the fixing bracket, and the fixing bracket forms a fitted portion which is fitted into the fitting portion, and an assembly direction of the camera bracket relative to the camera main member, and an assembly direction of the camera bracket relative to the fixing bracket are different directions, and a fitting direction between the fitting portion and the fitted portion is about a same direction as the assembly direction of the camera bracket relative to the fixing bracket.

2. A camera unit according to claim 1, wherein the engagement piece moves in a width direction of the camera main member.

3. A camera unit according to claim 1, wherein the fitting portion and the fitted portion are formed such that one is a fitting projection, and another is a recess portion.

4. A camera unit comprising:
a camera main member;
a camera bracket assembled to the camera main member by a first engagement device; and
a fixing bracket assembled to the camera bracket by a second engagement device so as to mount the camera main member on an attachment object,
wherein the first engagement device includes an engagement projection provided in the camera main member, and an engagement piece provided movably in the camera bracket so as to become engageable with the engagement projection accompanied by a moving displacement,
the fixing bracket includes a control portion disposed in a movement space of the engagement piece in a state wherein the camera bracket is assembled by the second engagement device, so that the engagement piece thereof becomes unmovable, and
the second engagement portion includes an engagement hole provided in the fixing bracket and passing through in a width direction, and an engagement projection which is provided in the camera bracket and which is engageable with and disengageable from the engagement hole.

5. A camera unit according to claim 4, wherein the camera bracket includes an operation piece portion which can move in a width direction, and the operation piece portion forms the engagement projection and an operation portion for releasing an engagement.

* * * * *